(12) United States Patent
Zhou

(10) Patent No.: US 10,232,595 B2
(45) Date of Patent: Mar. 19, 2019

(54) ARAMID HONEYCOMB FIBER PAPER AND PREPARATION METHOD THEREOF

(71) Applicant: X-FIPER New Material Co., Ltd., Suzhou, Jiangsu (CN)

(72) Inventor: Zhong Zhou, Jiangsu (CN)

(73) Assignee: X-FIPER NEW MATERIAL CO., LTD, Suzhou, Jiangsu (CN)

( * ) Notice: Subject to any disclaimer, the term of this patent is extended or adjusted under 35 U.S.C. 154(b) by 247 days.

(21) Appl. No.: 15/238,946

(22) Filed: Aug. 17, 2016

(65) Prior Publication Data

US 2017/0050420 A1     Feb. 23, 2017

(30) Foreign Application Priority Data

Aug. 19, 2015   (CN) .......................... 2015 1 0508299

(51) Int. Cl.
*B32B 29/00* (2006.01)
*B32B 3/12* (2006.01)
(Continued)

(52) U.S. Cl.
CPC .............. *B32B 29/005* (2013.01); *B32B 3/12* (2013.01); *B32B 3/30* (2013.01); *B32B 5/02* (2013.01); *B32B 5/08* (2013.01); *B32B 5/26* (2013.01); *B32B 7/02* (2013.01); *B32B 7/12* (2013.01); *B32B 37/15* (2013.01); *D21H 13/26* (2013.01); *D21H 27/30* (2013.01); *B32B 2037/1215* (2013.01); *B32B 2250/03* (2013.01); *B32B 2250/20* (2013.01); *B32B 2250/26* (2013.01); *B32B 2250/40* (2013.01); *B32B 2262/0269* (2013.01); *B32B 2262/14* (2013.01); *B32B 2305/22* (2013.01); *B32B 2307/718* (2013.01);
(Continued)

(58) Field of Classification Search
None
See application file for complete search history.

(56) References Cited

U.S. PATENT DOCUMENTS

| 5,320,892 A | * | 6/1994 | Hendren | .................. B32B 5/26 428/116 |
| 5,622,775 A | * | 4/1997 | Burks, Jr. | ................ B32B 5/26 442/392 |

(Continued)

OTHER PUBLICATIONS

Derwent Abstract of CN 104631199 (Acc-No. 2015-43989X). (Year: 2015).*

*Primary Examiner* — Kevin M Bernatz
(74) *Attorney, Agent, or Firm* — Locke Lord LLP; Tim Tingkang Xia, Esq.

(57) ABSTRACT

The present invention disclose an aramid honeycomb fiber paper and a preparation method thereof. The aramid fibre honeycomb fiber paper comprises a top layer aramid paper, a base layer aramid paper, and a bottom layer aramid paper composited sequentially, wherein the thickness sum of the top layer aramid paper and the bottom layer aramid paper is less than the thickness of the base layer aramid paper; a plurality of first protrusions and second protrusions arranged at intervals are arranged on a reverse side of the top layer aramid paper; The present invention has good flame retardancy, high tearing strength, and high bond strength, is not easy to layer and fracture, and has high porosity factor, good air permeability, and light weight.

7 Claims, 1 Drawing Sheet

(51) Int. Cl.
  *B32B 3/30*    (2006.01)
  *B32B 5/26*    (2006.01)
  *D21H 13/26*   (2006.01)
  *D21H 27/30*   (2006.01)
  *B32B 5/02*    (2006.01)
  *B32B 5/08*    (2006.01)
  *B32B 7/02*    (2019.01)
  *B32B 7/12*    (2006.01)
  *B32B 37/15*   (2006.01)
  *B32B 37/12*   (2006.01)

(52) U.S. Cl.
  CPC ..... *B32B 2307/732* (2013.01); *B32B 2605/00* (2013.01); *B32B 2607/00* (2013.01)

(56) References Cited

U.S. PATENT DOCUMENTS

| | | | | |
|---|---|---|---|---|
| 5,738,925 | A * | 4/1998 | Chaput | B32B 3/10 428/101 |
| 6,544,622 | B1 * | 4/2003 | Nomoto | D21H 13/26 428/116 |
| 8,974,065 | B2 * | 3/2015 | Yoshida | B32B 3/30 359/359 |
| 10,059,423 | B2 * | 8/2018 | Smithson | B32B 5/22 |
| 2002/0025410 | A1 * | 2/2002 | Taniguchi | B32B 27/00 428/167 |
| 2004/0060655 | A1 * | 4/2004 | Kawka | B32B 5/14 156/309.6 |
| 2005/0032975 | A1 * | 2/2005 | Sakaguchi | B32B 27/12 524/589 |
| 2006/0157213 | A1 * | 7/2006 | Ronnenberg | D21F 1/009 162/192 |
| 2006/0225952 | A1 * | 10/2006 | Takayasu | G10K 11/162 181/294 |
| 2006/0266486 | A1 * | 11/2006 | Levit | D21H 13/26 162/146 |
| 2007/0297702 | A1 * | 12/2007 | Zaggia | B32B 3/263 383/200 |
| 2008/0128202 | A1 * | 6/2008 | Palumbo | B32B 3/12 181/292 |
| 2010/0028593 | A1 * | 2/2010 | Taketa | B29C 43/222 428/113 |
| 2011/0096517 | A1 * | 4/2011 | Yada | H05K 3/0097 361/752 |
| 2011/0174452 | A1 * | 7/2011 | Heng | D21H 13/26 162/146 |
| 2011/0268912 | A1 * | 11/2011 | Bowman | E04B 5/043 428/99 |
| 2016/0107414 | A1 * | 4/2016 | Krishnasamy | B32B 5/024 428/92 |
| 2016/0297174 | A1 * | 10/2016 | Kim | D04H 1/4374 |
| 2017/0225428 | A1 * | 8/2017 | Muir | B32B 5/18 |

* cited by examiner

ARAMID HONEYCOMB FIBER PAPER AND PREPARATION METHOD THEREOF

CROSS-REFERENCE TO RELATED APPLICATION

This application claims priority of application No. 201510508299.6, filed on Aug. 19, 2015 in P.R. China.

TECHNICAL FIELD

The present invention relates to an artificially synthesized fiber paper, and more particularly, to a aramid honeycomb fiber paper and a preparing method thereof.

BACKGROUND ART

With the quick development of a high-speed rail and a subway, a honeycomb material, especially an aramid paper base honeycomb material is widely used. The density of an aramid paper is small. Therefore, the aramid paper can be configured to a floor board of a high speed train, a wall panel of a wagon body, an automobile door, and other part, so as to achieve light weight of a vehicle.

A traditional aramid paper base honeycomb material is a single layer structure that is generally and mainly comprised of pure para-position aramid or meta-amide pulp and para-position chopped fiber. For example, Chinese Patent CN201110406330.7 discloses paper preparation using the pure para-position aramid fiber through mixing, wherein para-position aramid pulp plays the role of adhesion, but the rigidity of the para-position aramid is too strong, the compatibility of the para-position aramid pulp as an adhesive material with para-position chopped fiber is bad, and the tear strength of the aramid paper base honeycomb material prepared is low, which cannot satisfy the requirement.

In order to solve the problem of low tear strength, Chinese Patent CN201210371036.1 provides a method that a part of para-position aramid short fiber is replaced by polyimide fiber, and then is mixed with the para-position aramid pulp for preparation, wherein the polyimide fiber needs t be defibered and dispersed. The method can increase the tear strength of the para-position aramid paper, but the problem that the compatibility between fibers of different forms is bad is not solved, and the toughness of the para-position aramid paper base material prepared is bad, and is easy to fracture.

Therefore, a new honeycomb fiber paper shall be provided to solve the problem above.

SUMMARY OF THE INVENTION

The object of the present invention lies in providing a aramid honeycomb fiber paper that has good flame retardancy, high tearing strength, and high bond strength, is not easy to layer and fracture, and has high porosity factor, good air permeability, and light weight.

In order to achieve the object above, the technical solutions used by the present invention are as follows.

A aramid honeycomb fiber paper comprises a top layer aramid paper, a base layer aramid paper, and a bottom layer aramid paper made of a meta-amide precipitation fiber and a meta-amide chopped fiber, wherein the thickness sum of the top layer aramid paper and the bottom layer aramid paper is less than the thickness of the base layer aramid paper; a reverse side of the top layer aramid paper and a front side of the base layer aramid paper, as well as the reverse side of the base layer aramid paper and the front side of the bottom layer aramid paper are compositely bonded through a hot melt adhesive; a plurality of first protrusions and second protrusions arranged at intervals are arranged on the reverse side of the top layer fibre paper; a first groove matched with the first protrusion and a second groove matched with the second protrusion are arranged on the front side of the base layer aramid paper; a plurality of third protrusions and fourth protrusions arranged at intervals are arranged on the front side of the bottom layer fibre paper; and a third groove matched with the third protrusion and a fourth groove matched with the fourth protrusion are arranged on the reverse side of the base layer aramid paper.

Preferably, on the reverse side of the top layer aramid paper, both the first protrusion and the second protrusion are cylindrical, except the part of the first protrusion and the second protrusion being plane, which is recorded as a first plane part; a center of gravity of any cross section of the first protrusion is on a first straight line; the center of gravity of any cross section of the second protrusion is on a second straight line; the first straight line is parallel to the second straight line; and an included angle of the first protrusion and the first plane part equals to the included angle of the second protrusion and the first plane part.

Preferably, the included angle of the first protrusion and the first plane part is 10° to 25°, and the orientation of the first protrusion is contrary to the orientation of the second protrusion.

Preferably, on the front side of the bottom layer aramid paper, both the third protrusion and the fourth protrusion are cylindrical, except the part of the third protrusion and the fourth protrusion being plane, which is recorded as a second plane part; the center of gravity of any cross section of the third protrusion is on a third straight line; the center of gravity of any cross section of the fourth protrusion is on a fourth straight line; the third straight line is parallel to the fourth straight line; and the included angle of the third protrusion and the second plane part equals to the included angle of the fourth protrusion and the second plane part.

Preferably, the included angle of the third protrusion and the second plane part is 10° to 25°, and the orientation of the third protrusion is contrary to the orientation of the fourth protrusion.

Preferably, In the top layer aramid paper and the bottom layer aramid paper, the content of the meta-amide precipitation fiber is 30-40 wt % and the content of the meta-amide chopped fiber is 60-70 wt %, and the gram weight is 5-10 g/m$^2$.

Preferably, In the base layer aramid paper, the content of the meta-amide precipitation fiber is 30-40 wt % and the content of the meta-amide chopped fiber is 60-70 wt %, and the gram weight is 20-30 g/m$^2$.

Preferably, the meta-amide chopped fiber is comprised of the chopped fiber with length 6 mm and content 10-20 wt %, the chopped fiber with length 8 mm and content 20-30 wt %, and the chopped fiber with length 15 mm and content 50-60 wt %.

The present invention also provides a preparation method of the aramid honeycomb fiber paper above, comprising the following steps that:

a) the meta-amide chopped fiber with length 6 mm and content 10-20 wt %, the meta-amide chopped fiber with length 8 mm and content 20-30 wt %, and meta-amide chopped fiber with length 15 mm and content 50-60 wt % are mixed, and then defibered and dispersed process is performed using ultrasonic disperser to form liquid of the meta-amide chopped fiber;

b) the liquid of the meta-amide chopped fiber with content 60-70 wt % and the liquid of the meta-amide precipitation fiber with content 30 wt %-40 wt % are mixed to form mixed suspending liquid;

c) wet method papermaking process to the mixed suspending liquid is performed using an inclined wire former, and a top layer aramid raw paper, a base layer aramid raw paper and a bottom layer aramid raw paper are made, wherein the gram weights of the top layer aramid raw paper and the bottom layer aramid raw paper are 5-10 g/m², and the gram weight of the base layer aramid raw paper is 20-30 g/m²;

d) a hot pressing process is respectively performed to the top layer aramid raw paper, the base layer aramid raw paper, and the bottom layer aramid raw paper, so that the reverse side of the top layer aramid raw paper forms the first protrusion and the second protrusion, that is, the top layer aramid paper is formed, the front side of the bottom layer aramid raw paper forms the third protrusion and the fourth protrusion, that is, the bottom layer aramid paper is formed, the front side of the base layer aramid raw paper forms the first groove and the second groove, the reverse side of the base layer aramid raw paper forms the third groove and the fourth groove, that is, the base layer aramid paper is formed; and e) under the condition of temperature 170° C. and pressure 255 Kg/cm, the top layer aramid paper, the base layer aramid paper, and the bottom layer aramid paper are compositely bonded in sequence using the hot melt adhesive, and the first protrusion stretches into the first groove, the second protrusion stretches into the second groove, the third protrusion stretches into the third groove, and the fourth protrusion stretches into the fourth groove, forming the aramid honeycomb fiber paper.

Compared with the prior art, the beneficial effects of the aramid honeycomb fiber paper according to the present invention lie in that: the aramid honeycomb fiber paper has good flame retardancy, high tearing strength, hydrogen bridge existing between fibers of different forms, and good compatibility; the molecular chain of the meta position aramid has peculiar serrated structure, so that the aramid honeycomb fiber paper has certain toughness, and is not easy to fracture; the aramid honeycomb fiber paper has high factor of porosity, good air permeability, light weight, and stable adhesive absorbing amount; a "concave-convex" structure increases the bond strength between layer and layer, and solves the problem that the aramid paper is easy to layer after being composited so as to lead to decrease of performance of the honeycomb material.

Each mark in drawings is as follows: 1. the top layer aramid paper; 101. the first protrusion; 102. the second protrusion; 2. the base layer aramid paper; 3. the bottom layer aramid paper; 301. the third protrusion; and 302. the fourth protrusion.

DETAILED DESCRIPTION OF THE EMBODIMENTS

The present invention shall be further described in detail with reference to the embodiments.

Figure 1:
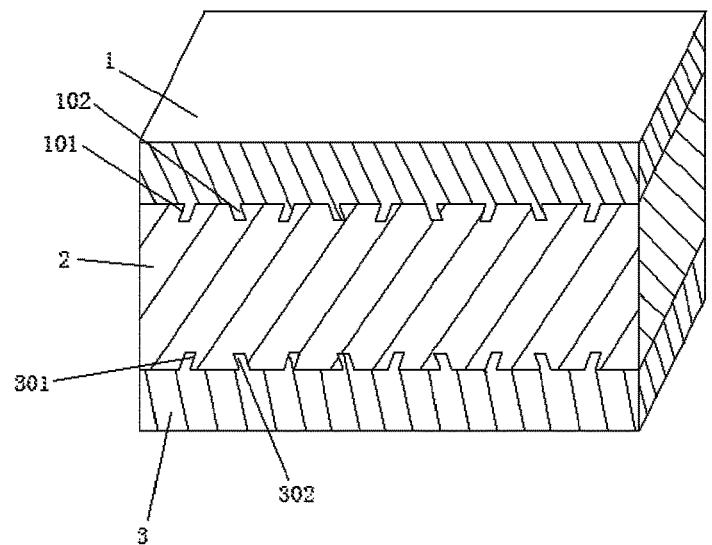
FIG. 1 is a structure diagram of the aramid honeycomb fiber paper according to the present invention.
Figure 2:
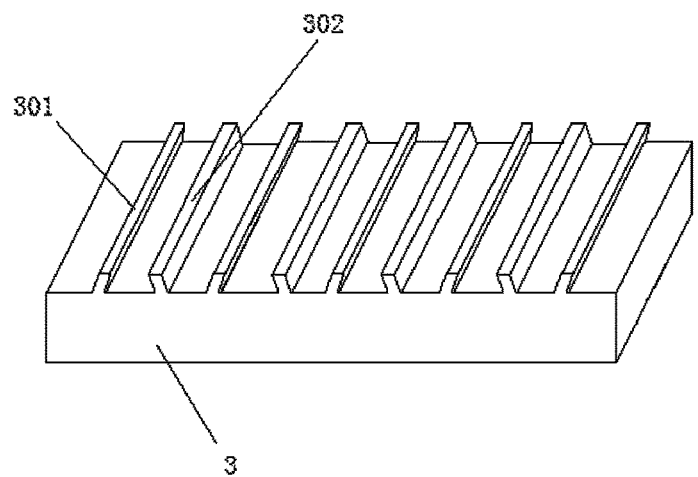
FIG. 2 is a structure diagram of the bottom layer aramid raw paper according to the present invention.
Figure 3:
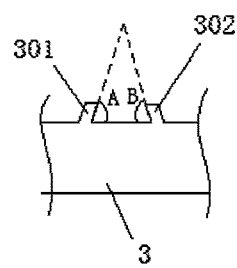
FIG. 3 is a partial view of a front view of FIG. 2.

With reference to FIG. 1 to FIG. 3, the aramid honeycomb fiber paper according to the present invention comprises a top layer aramid paper 1, a base layer aramid paper 2, and a bottom layer aramid paper 3 made of a meta-amide precipitation fiber and a meta-amide chopped fiber, 1 wherein the thickness sum of the top layer aramid paper 1 and the bottom layer aramid paper 3 is less than the thickness of the base layer aramid paper 2; a reverse side of the top layer aramid paper 1 and a front side of the base layer aramid paper 2, as well as the reverse side of the base layer aramid paper 2 and the front side of the bottom layer aramid paper 3 are compositely bonded through a hot melt adhesive; a plurality of first protrusions 101 and second protrusions 102 arranged at intervals are arranged on the reverse side of the top layer fibre paper 1; a first groove matched with the first protrusion 101 and a second groove matched with the second protrusion 102 are arranged on the front side of the base layer aramid paper 2; a plurality of third protrusions 301 and fourth protrusions 302 arranged at intervals are arranged on the front side of the bottom layer fibre paper 3; and a third groove matched with the third protrusion 301 and a fourth groove matched with the fourth protrusion 302 are arranged on the reverse side of the base layer aramid paper 2.

Wherein, on the reverse side of the top layer aramid paper 1, both the first protrusion 101 and the second protrusion 102 are cylindrical, except the part of the first protrusion 101 and the second protrusion 102 being plane, which is recorded as a first plane part; a center of gravity of any cross section of the first protrusion 101 is on a first straight line; the center of gravity of any cross section of the second protrusion 102 is on a second straight line; the first straight line is parallel to the second straight line; and an included angle of the first protrusion 101 and the first plane part equals to the included angle of the second protrusion 102 and the first plane part. The included angle of the first protrusion 101 and the first plane part is 10° to 25°, and the orientation of the first protrusion 101 is contrary to the orientation of the second protrusion 102. This structural design can increase the contact area of the top layer aramid paper 1 and the base layer aramid paper 2, and can increase the tearing strength meanwhile.

On the front side of the bottom layer aramid paper 3, both the third protrusion 301 and the fourth protrusion 302 are cylindrical, except the part of the third protrusion 301 and the fourth protrusion 302 being plane, which is recorded as a second plane part; the center of gravity of any cross section of the third protrusion 301 is on a third straight line; the center of gravity of any cross section of the fourth protrusion 302 is on a fourth straight line; the third straight line is parallel to the fourth straight line; and the included angle of the third protrusion 301 and the second plane part equals to the included angle of the fourth protrusion 302 and the second plane part. The included angle of the third protrusion 301 and the second plane part is 10° to 25°, and the orientation of the third protrusion 301 is contrary to the orientation of the forth protrusion 302. This structural design can increase the contact area of the bottom layer aramid paper 3 and the base layer aramid paper 2, and can increase the tearing strength meanwhile.

As shown in FIG. 3, the included angle of the protrusion 301 and the second plane part is recorded as an angle A, the included angle of the fourth protrusion 302 and the second plane part is recorded as an angle B, and the angle A=the angle B=15° in the embodiment.

In the present invention, in the top layer aramid paper 1 and the bottom layer aramid paper 3, the content of a meta-amide precipitation fiber is 30-40 wt % and the content of a meta-amide chopped fiber is 60-70 wt %, and the gram weight is 5-10 g/m².

In the base layer aramid paper 2, the content of the meta-amide precipitation fiber is 30-40 wt % and the content of the meta-amide chopped fiber is 60-70 wt %, and the gram weight is 20-30 g/m². the meta-amide chopped fiber is comprised of a chopped fiber with length 6 mm and content 10-20 wt %, a chopped fiber with length 8 mm and content 20-30 wt %, and a chopped fiber with length 15 mm and content 50-60 wt %.

In a preferred embodiment according to the present invention, the content of a chopped fiber with length 6 mm is 10-20 wt %, the content of a chopped fiber with length 8 mm is 20-30 wt %, and the content of a chopped fiber with length 15 mm is 50-60 wt %.

In another preferred embodiment according to the present invention, the content of the chopped fiber with length 6 mm is 20 wt %, the content of the chopped fiber with length 8 mm is 20 wt %, and the content of the chopped fiber with length 15 mm is 60 wt %.

In another preferred embodiment according to the present invention, the content of the chopped fiber with length 6 mm is 20 wt %, the content of the chopped fiber with length 8 mm is 30 wt %, and the content of the chopped fiber with length 15 mm is 50 wt %.

In another preferred embodiment according to the present invention, the content of the chopped fiber with length 6 mm is 15 wt %, the content of the chopped fiber with length 8 mm is 28 wt %, and the content of the chopped fiber with length 15 mm is 57 wt %.

The present invention also provides a preparation method of the aramid honeycomb fiber paper above, comprising the following steps that:

a) the meta-amide chopped fiber with length 6 mm and content 10-20 wt %, the meta-amide chopped fiber with length 8 mm and content 20-30 wt %, and meta-amide chopped fiber with length 15 mm and content 50-60 wt % are mixed, and then defibered and dispersed process is performed using ultrasonic disperser to form liquid of the meta-amide chopped fiber;

b) the liquid of the meta-amide chopped fiber with content 60-70 wt % and the liquid of the meta-amide precipitation fiber with content 30 wt %-40 wt % are mixed to form mixed suspending liquid;

c) wet method papermaking process to the mixed suspending liquid is performed using an inclined wire former, and the top layer aramid raw paper, the base layer aramid raw paper and the bottom layer aramid raw paper are made, wherein the gram weights of the top layer aramid raw paper and the bottom layer aramid raw paper are 5-10 g/m², and the gram weight of the base layer aramid raw paper is 20-30 g/m²;

d) a hot pressing process is respectively performed to the top layer aramid raw paper, the base layer aramid raw paper, and the bottom layer aramid raw paper, so that the reverse side of the top layer aramid raw paper forms the first protrusion 101 and the second protrusion 102 (i.e., the top layer aramid paper 1 is formed), the front side of the bottom layer aramid raw paper forms the third protrusion 301 and the fourth protrusion 302 (i.e., the bottom layer aramid paper 3 is formed), the front side of the base layer aramid raw paper forms the first groove and the second groove, the reverse side of the base layer aramid raw paper forms the third groove and the fourth groove (i.e., the base layer aramid paper 2 is formed); and e) under the condition of temperature 170° C. and pressure 255Kg/cm, the top layer aramid paper 1, the base layer aramid paper 2, and the bottom layer aramid paper 3 are compositely bonded in sequence using the hot melt adhesive, and the first protrusion 101 stretches into the first groove, the second protrusion 102 stretches into the second groove, the third protrusion 301 stretches into the third groove, and the fourth protrusion 302 stretches into the fourth groove, forming the aramid honeycomb fiber paper.

In conclusion, the present invention has good flame retardancy, high tearing strength, hydrogen bridge existing between fibers of different forms, and good compatibility; the molecular chain of the meta position aramid has peculiar serrated structure, so that the present invention has certain toughness, and is not easy to fracture, and can serve as a supporting material to be widely used on aircraft and high speed train; the present invention has high factor of porosity, good air permeability, light weight, and satisfies the requirement on light weight of a vehicle; the present invention has high intensity and stable adhesive absorbing amount; and a "concave-convex" structure increases the bond strength between layer and layer, and solves the problem that the aramid paper is easy to layer after being composited so as to lead to decrease of performance of the honeycomb material. A schematic description is performed to the present invention and the embodiments thereof, and the description does not have limitation. The drawings only show one of embodiments of the present invention, and the actual structure is not limited to it. Therefore, if those skilled in the art is inspired by it, in the case that the creation objectives of the present invention is not deviated, technical solutions that design a structure manner and embodiments similar to the technical solution without going through inventiveness shall fall within the protection scope of the present invention.

What is claimed is:

1. An aramid honeycomb fiber paper, comprising a top layer aramid paper, a base layer aramid paper, and a bottom layer aramid paper, wherein the top layer, base layer, and bottom layer are made of a meta-amide precipitation fiber and a meta-amide chopped fiber, wherein the thickness sum of the top layer aramid paper and the bottom layer aramid paper is less than the thickness of the base layer aramid paper; a reverse side of the top layer aramid paper and a front side of the base layer aramid paper, as well as the reverse side of the base layer aramid paper and the front side of the bottom layer aramid paper are compositely bonded through a hot melt adhesive; a plurality of first protrusions and second protrusions arranged at intervals are arranged on the reverse side of the top layer fibre paper; a first groove matched with the first protrusion and a second groove matched with the second protrusion are arranged on the front side of the base layer aramid paper; a plurality of third protrusions and fourth protrusions arranged at intervals are arranged on the front side of the bottom layer fibre paper; and a third groove matched with the third protrusion and a fourth groove matched with the fourth protrusion are arranged on the reverse side of the base layer aramid paper;

wherein on the reverse side of the top layer aramid paper, both the first protrusion and the second protrusion are cylindrical, except the part of the first protrusion and the second protrusion being plane, which is recorded as a first plane part; a center of gravity of any cross section of the first protrusion is on a first straight line; the center of gravity of any cross section of the second protrusion is on a second straight line; the first straight line is parallel to the second straight line; and an included angle of the first protrusion and the first plane part equals to the included angle of the second protrusion and the first plane part.

2. The aramid honeycomb fiber paper according to claim 1, wherein the included angle of the first protrusion and the first plane part is 10° to 25°, and the orientation of the first protrusion is contrary to the orientation of the second protrusion.

3. The aramid honeycomb fiber paper according to claim 1, wherein on the front side of the bottom layer aramid paper, both the third protrusion and the fourth protrusion are cylindrical, except the part of the third protrusion and the fourth protrusion being plane, which is recorded as a second plane part; the center of gravity of any cross section of the third protrusion is on a third straight line; the center of gravity of any cross section of the fourth protrusion is on a fourth straight line; the third straight line is parallel to the fourth straight line; and the included angle of the third protrusion and the second plane part equals to the included angle of the fourth protrusion and the second plane part.

4. The aramid honeycomb fiber paper according to claim 3, wherein the included angle of the third protrusion and the second plane part is 10° to 25°, and the orientation of the third protrusion is contrary to the orientation of the fourth protrusion.

5. The aramid honeycomb fiber paper according to claim 1, wherein in the top layer aramid paper and the bottom layer aramid paper, the content of the meta-amide precipitation fiber is 30-40 wt % and the content of the meta-amide chopped fiber is 60-70 wt %, and the gram weight is 5-10 g/m$^2$.

6. The aramid honeycomb fiber paper according to claim 1, wherein in the base layer aramid paper, the content of the meta-amide precipitation fiber is 30-40wt % and the content of the meta-amide chopped fiber is 60-70 wt % , and the gram weight is 20-30g/m$^2$.

7. The aramid honeycomb fiber paper according to claim 1, wherein the meta-amide chopped fiber is comprised of the chopped fiber with length 6 mm and content 10-20 wt %, the chopped fiber with length 8 mm and content 20-30 wt %, and the chopped fiber with length 15 mm and content 50-60 wt %.

* * * * *